United States Patent [19]
Koon

[11] Patent Number: 5,005,407
[45] Date of Patent: Apr. 9, 1991

[54] FLUID LEVEL SENSING SYSTEM

[75] Inventor: Terry D. Koon, Florence, Oreg.

[73] Assignee: Level Electronics, Inc., San Jose, Calif.

[21] Appl. No.: 547,419

[22] Filed: Jul. 2, 1990

Related U.S. Application Data

[63] Continuation of Ser. No. 256,605, Oct. 11, 1988, abandoned.

[51] Int. Cl.$^5$ ............................................. G01F 23/26
[52] U.S. Cl. ................................ 73/290 R; 73/304 C; 340/620
[58] Field of Search ........................ 73/290 R, 304 C; 304/618, 620

[56] References Cited

U.S. PATENT DOCUMENTS

| | | | |
|---|---|---|---|
| 2,751,531 | 6/1956 | Barrett | 317/246 |
| 2,868,015 | 1/1959 | Haropulos | 73/304 C |
| 3,010,320 | 11/1961 | Sollecito | 73/304 C |
| 3,025,464 | 3/1962 | Bond | 324/61 |
| 3,283,577 | 11/1966 | Schuck | 73/304 C |
| 3,321,971 | 5/1967 | Llewellyn et al. | 73/304 C |
| 3,862,571 | 1/1975 | Vogel | 73/304 C |
| 3,918,035 | 11/1975 | Eshraghian | 73/290 R |
| 3,935,739 | 2/1976 | Ells | 73/304 C |
| 4,002,996 | 1/1977 | Klebanoff et al. | 340/620 |
| 4,003,259 | 1/1977 | Hope | 73/304 C |
| 4,010,650 | 3/1977 | Piatkowski, Jr. | 73/304 C |
| 4,086,528 | 4/1978 | Walton | 73/304 C |
| 4,099,167 | 7/1978 | Pomerantz et al. | 340/620 |
| 4,165,641 | 8/1979 | Pomerantz et al. | 73/290 R |
| 4,245,188 | 1/1981 | Rottmar | 324/61 P |
| 4,261,397 | 4/1981 | Guy | 340/618 |
| 4,419,623 | 12/1983 | Ketchledge | 324/59 |
| 4,518,956 | 5/1985 | Kitagawa et al. | 73/304 C |
| 4,589,281 | 5/1986 | Aldrich | 73/304 C |
| 4,603,581 | 8/1986 | Yamanoue et al. | 340/620 |
| 4,688,029 | 8/1987 | Kawasaki et al. | 340/618 |
| 4,706,203 | 11/1987 | Ramsdale et al. | 73/304 C |
| 4,749,988 | 6/1988 | Berman et al. | 73/290 R |
| 4,788,488 | 11/1988 | Kramer et al. | 73/304 C |

FOREIGN PATENT DOCUMENTS

| | | | |
|---|---|---|---|
| 2592713 | 7/1987 | France | 73/304 C |
| 2025623 | 1/1980 | United Kingdom | 73/304 C |

*Primary Examiner*—William A. Cuchlinski, Jr.
*Assistant Examiner*—Diego F. F. Gutierrez
*Attorney, Agent, or Firm*—Dority & Manning

[57] ABSTRACT

A storage installation which is capable of storing a variety of materials, both conductive and non-conductive, includes a level sensing device disposed entirely externally of the container for the material such as to the exterior of the walls thereof. The sensing device includes an elongated strip of metal preferably copper or brass cut to the length of the container when arranged in a vertical direction therefor and applied to the exterior of the container by suitable adhesive material. The sensing element serves as a capacitor component in an oscillator circuit which is arranged whereby the electrostatic field emanating from the sensing strip will change the oscillator amplitude proportional to the level of the material in the container. The detected changes in amplitude in the oscillator circuit will produce a DC level proportional to the level of the oscillator amplitude. The DC level in turn will be processed by a remote indicator circuit to drive a readout meter, bar graph or digital unit.

9 Claims, 2 Drawing Sheets

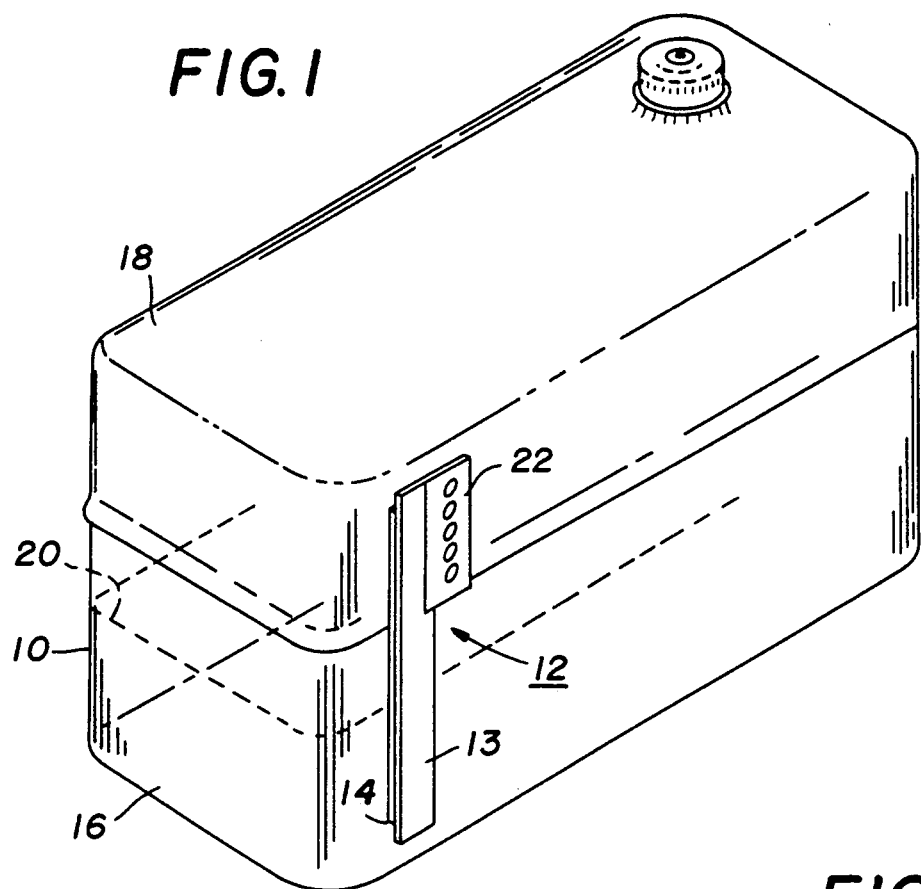
FIG.1
FIG.4
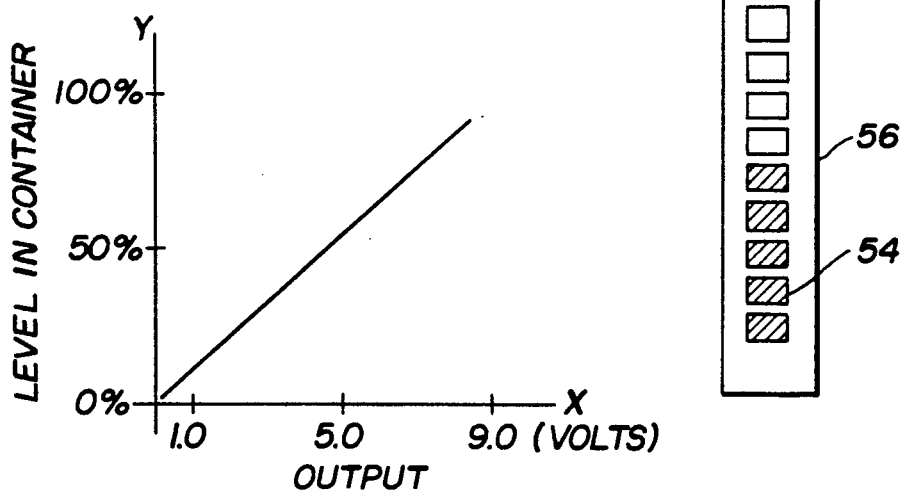
FIG.5

FLUID LEVEL SENSING SYSTEM

This is a continuation of U.S. application Ser. No. 07/256,605, filed Oct. 11, 1988, which was abandoned upon the filing hereof.

BACKGROUND OF THE INVENTION

This invention relates generally to a fluid level sensing system for measuring the quantity of a medium in a storage container. More particularly, this invention relates to a level sensing arrangement for sensing and displaying the level of the medium in the container and indicating the quantity of the medium therein in terms of its level, and at a remote location.

Liquid level measuring systems and indicators therefor typically have been limited to arrangements which include a sensing element or apparatus emersed in the medium within the container. Many level gauges require that the material whose level is detected be in electrical contact with the gauge, while others require that the material be electrically conductive.

In the prior art, U.S. Pat. No. 2,868,015 discloses a level indicator for conductive liquids utilizing a plurality of vertically stacked capacitive elements arranged in a tank. The inherent drawback generally in such systems is that they are operable only with electrically conductive filler fluids which replace the fuel actually being measured, and they are potentially dangerous if the medium being measured are combustible fluids, such as gasoline, or the like. More important however, the capacitive unit disclosed in this patent must be emersed within the fluid in the tank and is unadaptable to be utilized exteriorly of the tank.

The liquid level measuring device disclosed in U.S. Pat. No. 2,751,531 also requires the sensing condenser to be emersed in the tank containing the liquid the level of which is to be sensed. The complex structure of the capacitive unit is such that it is completely incapable of use outside of the tank.

U.S. Pat. Nos. 3,010,320, 3,025,464, 3,321,971, 3,862,571 and 3,935,739 disclose level measuring devices for liquids which require electrical contact with the liquids being measured. Such devices generally suffer from the same drawbacks noted above with reference to the other patents requiring electrical contact between the mediums being measured and the various sensing probe members.

The use of an externally applied sensing device is disclosed in U.S. Pat. No. 4,165,641. That device is in the form of an inductance coil or rather a plurality of coils wound on a coil former for holding and shaping the coils. As the level of the liquid in the container rises or falls it comes into close proximity to one of the inductive coils. The electrical conduction of the liquid changes the Q of the coil thereby quenching oscillation in a detector circuit. An important ingredient in the operation of this level sensing device required the fluid, the level of which is being detected, to be conductive to some extent and therefore is only operable with limited types of material, such as at least partially conductive materials. The use of inductive coils also limit the application of this measuring means to liquid containers have coil carrying tubes.

SUMMARY OF THE INVENTION

The present invention has been devised to broaden the applications of liquid sensing devices to stored containers which are suitable for containing non-conductive as well as conductive material. The invention is applicable to any shape of container, is insensitive to the location and positioning of the container, but most important, may be applied and detached from a container in the manner of seconds of time to render the sensing system operative. To this extent of applicability, the present invention is an improvement over the level indicator disclosed by the same inventor herein in his application Ser. No. 168,976, filed on Mar. 16, 1988, now U.S. Pat. No. 4,864,857.

In the present invention, a sensing probe has been devised so that it may be quickly and easily applied to the external surface of a container containing the liquid to be sensed. Such goal is accomplished by utilizing a sensing probe adapted for stick-on application to the exterior of the container such as for example by the use of a double sided adhesive tape. The probe itself is an electronic component for an oscillator circuit and sensing circuit which may be also applied with the probe to the exterior surface of the container.

The sensing strip or probe, by virtue of the electrical arrangement in the sensing circuit, produces an electrostatic field in the sensing strip. The fluid in the tank will influence the electrostatic field emanating from the sensing strip in such a manner that the oscillator amplitude will change proportional to the fluid level in the container. This change in amplitude eventually is utilized to produce an indication of the liquid level for use in measuring the quantity of the medium in the container. A remotely located indicator device may be utilized to display the quantity of medium in the container.

Therefore it is the principle object of the present invention to sense the level of a medium in a container exteriorly of the container thereby eliminating all hazards relative to the nature of the medium.

It is another important object of the invention to measure the liquid level of a container without requiring the use of any sensing probe or the like within the container itself, or in direct contact with the medium therein.

Another object of the invention is to utilize a liquid level sensing system which may be quickly and easily applied to the particular container containing the medium the level of which is to be sensed and measured.

BRIEF DESCRIPTION OF THE DRAWINGS

These and other objects of the present invention will become apparent after studying the following description taken in conjunction with the drawings wherein:

FIG. 1 is an isometric view of a container containing a medium the level of which is to be sensed with the probe and sensing circuit applied directly to the exterior of the container;

FIG. 4 is a schematic illustration of an LED bar graph useful with the circuit of FIG. 3, and FIG. 5 is an exemplary graph showing representative oscillator detector circuit output levels relative different levels of a medium in a container.

DETAILED DESCRIPTION OF THE PREFERRED EMBODIMENT

Figure 2:
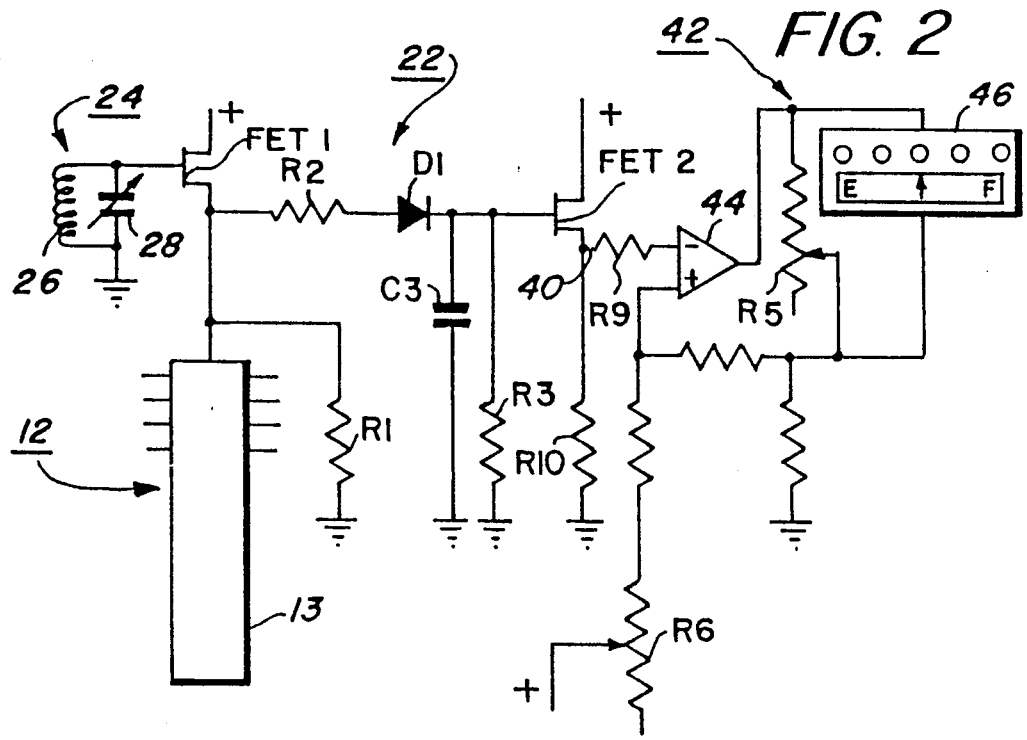
FIG. 2 is a circuit diagram of the level sensing system of the present invention with a level readout device connected thereto.

FIG. 1 illustrates a storage container having the liquid level sensing system of the present invention applied to the exterior surface thereof for indicating the level of medium stored within the container. The storage container 10 is made of plastic or fiberglass or of any other material having a low-dielectric constant, and may be of any shape, size, or form. The container 10 may be utilized in any environment or for any purpose, but the invention is particularly applicable for tanks utilized in RV vehicles and boats. For example, the container may be used to contain gasoline, oil, water, waste water, acids or any other fluids.

The sensing device and sensing circuit will not be adversely affected by solids involved in waste water, or damaged by acids, or affected by the growth of algae etc., in other waters since the sensing probe and sensing circuit are external to the liquids contained in the container. By virtue of this external application to the container, containers holding environmentally hazardous fluids do not have to be breached in order to facilitate installation.

The sensing element or probe for the present invention is generally indicated by the reference numeral 12 comprising a metallic strip 13, preferably made from copper or brass, and being applied to the exterior surface of the container 10 by means of a two-sided adhesive tape 14.

As shown in FIG. 1, the strip or probe 12 is applied to the container 10 in a vertical orientation from the bottom wall 16 of the container to the top wall 18 thereof. In this manner, the strip 13 is related to the level 20 of the medium to be sensed so as to extend in a line generally parallel to the range of movement of the level, such range being defined by an empty container to full capacity thereof. In order to protect the sensing element 12 from corrosion or other adverse affects produced in the atmosphere, the probe may be coated with suitable plastic material (i.e., encapsulated with non-conductive material).

A sensing circuit generally indicated by the reference numeral 22 in the form of a printed circuit board, may be applied to the exterior surface of the container adjacent to the sensing probe 12. Of course, such printed circuit board (which is non-conductive) is thus insulatingly mounted on the coated sensing element 12. The circuit 22 comprises an oscillator detector 24 having an inductor 26 and variable capacitor 28. One side of the oscillator detector is connected to the gate of a junction FET 1 and its other side grounded. The source for the FET 1 is directly connected to the probe 12 and to ground through a resistor R1. With the drain for the FET 1 being supplied with electrical energy from a positive source, an electrostatic field is developed relative to the sensing element 12. With this arrangement, the fluid in the tank will influence the electrostatic field emanating from the sensing probe 12 in such a manner that the oscillator amplitude will change proportional to the level 20.

Absolute vertical orientation of the sensing strip 12 is not necessary, so long as the strip does ascend vertically in extending from the empty condition of the container to a medium level at full capacity. It will be appreciated that the strip 12 may be cut to length to suit the height of the container since the capability of the sensing circuit 22 is insensitive to the length of the strip. The electrostatic field associated with the strip penetrates the walls of the container to sense the presence or absence of the medium and the location of the level 20.

The source for FET 1 is also connected to a buffer circuit comprising diode D1 and junction FET 2 through a resistor R2. The plate for the diode D1 and the source for the FET 2 are connected to ground by way of capacitor C3 and resistor R3. With the drain of the FET 2 being connected to a source of positive voltage, the detector 24 and buffer circuit will supply a DC level output proportional to the level of the oscillator amplitude to the gate for FET 2.

By way of the conductor 40, the output of the sensing circuit 22 is applied to an amplifier circuit 42 as shown in FIG. 2. The amplifier circuit 42 includes an operational amplifier device 44 connected to a readout device 46 the form of which will be described below. A variable resistor R5 is connected across the readout device 46 at the output of the device 44 in order to permit adjustment of the high level of the amplifier output. The electrical power input side of the amplifier device 44 is connected to a source of positive voltage by way of a variable resistor R6 which serves as the low level adjustment for the amplifier. In this arrangement, as shown in FIG. 2, the amplifier circuit operates as a constant current source allowing for adjustment of the high level at R5 to be made after the low level at R6 is set without affecting the low level adjustment. The readout device 46 can be calibrated to serve as a direct readout of the level 20 in the container 10, such, for example, as an edge meter read-out.

Figure 3:
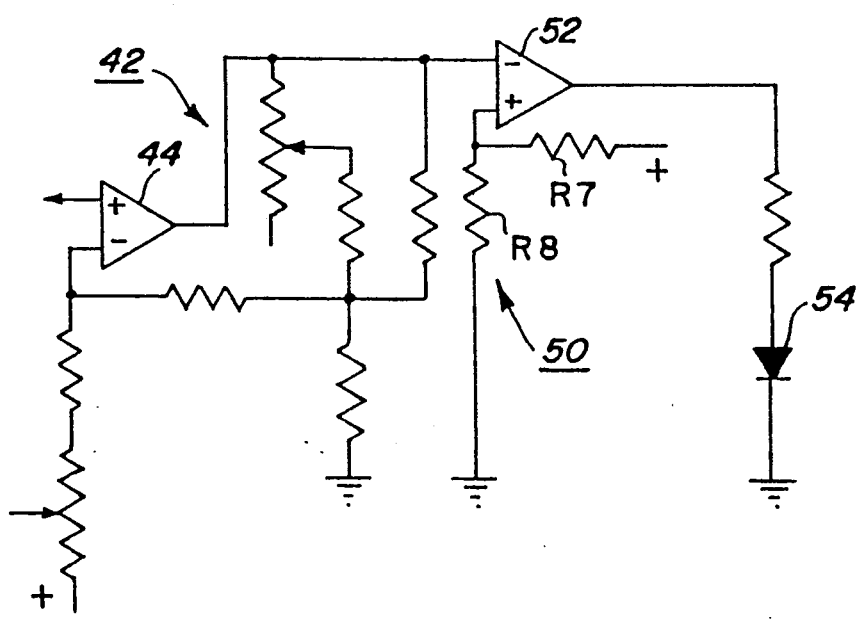
FIG. 3 is a circuit diagram similar to that of FIG. 2 but being connected to other suitable readout devices.

As shown in FIG. 3, the amplifier circuit 42 is associated with another form of a level readout device. In this arrangement, the output of the circuit 42 is connected to a plurality of comparator circuits, only one of which is shown generally by the numeral 50. The comparator circuit comprises a comparator device 52 having its source terminal connected to a source of DC voltage by way of a resistor R7 and to ground by way of resistor R8. The output of the comparator device 52 is connected to one of the diodes 54 of a LED bar graph 56. Each LED in the LED bar graph 56 is connected to a comparator circuit similar to the comparator circuit 50 to be energized respectively thereby. The comparator devices 52 for each of the comparative circuits are biased by the resistors R7, R8 allowing for sequential LED triggering proportional to the voltage level of the output of the amplifier circuit 42.

In FIG. 3, the diode 54 of the comparator circuit 50 is shown associated with the lowermost or "Empty" indication of the bar graph 56 (see FIG. 4). It will also be understood that for each LED indicator on the bar graph 56, a similar circuit 50 will be connected to the output of the amplifier circuit 42 and arranged so that there is sequential LED triggering which is proportional to the voltage level as previously stated.

In operation, the sensing element 13 of the probe 12 serves as a plate for a capacitor whereby the electrostatic field on the plate will vary in accordance with the level 20 of the medium to be sensed. The inductor coil 26 and the sensing element 13 with the variable capacitor 28 and the FET 1 form a high Q oscillator. Such oscillator preferably operates in a range from about 2 to about 400 kilohertz, in order to provide an effective range for sensing either conductive or non-conductive materials. In general, the preferred operating frequency will be relatively nearer the natural resonance of the coil 26 since the FET 1 is utilized in a source follower configuration having a gain of less than unity. When energized, current flows through the coil 26 allowing initial current flow through the resistor R1, the FET 1, and the capacitor 28 in conjunction with the capacitor component sensing element 13.

Upon current flow, oscillations begin immediately, due to the natural resonance of the coil 26. The resulting voltage fluctuations of the gate for the FET 1 cause the latter to act as a voltage control led resistance allowing voltage fluctuations across the resistor R1, the capacitor 28 and the capacitor component 13. The oscillator comprising the FET 1 provides extremely high DC oscillation between the coil 26 and the resistor R1, allowing the maintenance of high Q natural resonance oscillations across the coil 26.

The series parallel circuit of the capacitor component which is the form of the sensing element 13, the capacitor 28, and the inner element capacitance of the FET 1 causes the oscillator to oscillate at a point between the bottom and the top of the Q-curve of the high-Q oscillator. When the level 20 of the medium in the container 10 raises or lowers, the electrostatic field emanating from the sensing strip 13 will be affected and in such a manner that the oscillator amplitude will change proportional to the fluid level 20. Since the sensing element 13 is one capacitor component and works in conjunction with the capacitor 28, both interact with the coil 26 to cause the oscillator to shift to a different point on the Q-curve thereby producing a change in the amplitude of the oscillation voltage across the resistor R1.

The resistor R2, the coupling diode D1, the capacitor C3 and the resistor R3 form a decaying peak detector for converting the fluctuating oscillation voltage across the resistor R1 into a DC voltage at the gate for the FET 2. A representative example of such an output is shown in FIG. 5, which compares an exemplary only voltage level output (X-axis) with a percentage level of material or medium in the container (Y-axis). This DC voltage fluctuates directly proportional to the change in the electrostatic field emanating from the sensing strip 12 when a free flowing material varies in quantity within the container 10. Thus, oscillator detector 24 (e.g., elements 26, 28, with element 12 functioning as a capacitor component thereof) and such decaying peak detector (R2, D1, C3, and R3) may be viewed as an oscillator detector circuit having a variable amplitude output (as represented, for example, in FIG. 5) varying with sensed variations in the electrostatic field emanating from strip 12.

The junction FET 2 provides high impedance oscillation thus allowing low impedance signal handling at the source of this component without affecting the oscillator or the peak detector circuits.

The output of the oscillator detector circuit is conducted by way of the conductor 40 to the open loop gain operational amplifier 44 which functions as a voltage comparator means for providing output switching. This switching occurs when the input signal on the conductor 40 is impressed on the negative side of the amplifier 44 through a parallel resistor arrangement R9, R10 and coincides with the voltage selected in the variable resistor R6.

Various alternatives may be made to the above described circuits by those of ordinary skill in the art without departing from the scope of the invention. It will be understood any number of comparator circuits 50 may be employed, depending upon the number of level indications needed by the user. For example, if ten levels of indications corresponding to the quantity of material in the container 10 at any of those levels are desired, it will be understood that ten LED's in the device 56 and a comparator circuit 50 for each LED will be needed. It will also be understood that other forms of readout devices may be employed.

The foregoing description is intended by way of example only. It is to be understood that changes, alternatives, modifications and the like, may be made in the invention as described and illustrated without departing from the scope of the claims appended hereto.

What is claimed is:

1. A level sensing system for use with a storage container constructed of low dielectric constant material holding a stored medium, the level of which is to be sensed to determine the quantity of the medium therein, said level sensing system comprising: a single, unitary conductive sensing member adapted to be arranged on the exterior of the container along the height of such container for a distance corresponding to the level of the stored medium to be sensed, means for securing the sensing member to the container exterior surface, and circuit means having a source of electrical power connected to said sensing member for energizing said sensing member and effecting an electrostatic field therefrom, whereby said field emanating from said sensing member will vary in accordance with the level of the medium in the container, and wherein said circuit means further includes means for sensing variations of said electrostatic field, and means for indicating the level of the medium in the container responsive to such variations, wherein said circuit means includes an oscillator detector circuit with a variable amplitude output, and wherein said sensing member is associated with said oscillator detector circuit as a capacitor component thereof such that variations in said electrostatic field are adapted to correspondingly vary the amplitude of said output of said oscillator detector circuit, wherein a change in the amplitude of the output of said oscillator detector circuit indicates a change in the level of the stored medium.

2. The level sensing system defined in claim 1, wherein said means for securing includes a double sided adhesive strip.

3. The level sensing system defined in claim 1, wherein said sensing member comprises a copper strip.

4. The level sensing system defined in claim 1, wherein:
said means for indicating are connected to said output of said circuit means oscillator detector circuit and are positioned for sensing relatively remote therefrom.

5. A level sensing system for use with a storage container constructed of low dielectric constant material holding a stored medium, the level of which is to be sensed to determine the quantity of the medium therein, said level sensing system comprising: a single, unitary conductive sensing member adapted to be arranged on the exterior of the container along the height of such container for a distance corresponding to the level of the stored medium to be sensed, means for securing the sensing member to the container exterior surface, and circuit means having a source of electrical power connected to said sensing member for energizing said sensing member and effecting an electrostatic field therefrom, whereby said field emanating from said sensing member will vary in accordance with the level of the medium in the container, and wherein said circuit means further includes means for sensing variations of said electrostatic field, and means for indicating the level of the medium in the container responsive to such variations, wherein said circuit means includes an oscillator detector circuit with a variable amplitude output, and wherein said sensing member is associated with said oscillator detector circuit as a capacitor component thereof such that variations in said electrostatic field are adapted to correspondingly vary the amplitude of said output of said oscillator detector circuit, and further wherein said circuit means is insulatingly mounted on said sensing member.

6. The level sensing system defined in claim 5, wherein said conductive sensing member is coated with plastic material.

7. A level sensing system for determining the level of a stored medium indicative of the quantity thereof in a container made from non-conductive material, comprising:
- a single unitary stick-on metallic strip detachably applied to the exterior surface of the container and having a length approximately equal to the range of levels to be sensed,
- a circuit means having a source of electrical energy connected to said strip and arranged to induce an electrical characteristic therein in response to the range of levels to be determined, and for producing an output which fluctuates in direct proportion with the level of stored medium in the container, and
- indicating means connected to said circuit means and being sensitive to variations of said circuit means output for indicating the level of the stored medium in accordance with said variations,
- wherein said circuit means includes a variable amplitude output oscillator detector circuit with changes in said electrical characteristic of said metallic strip connected thereto correspondingly varying the output amplitude of said oscillator detector circuit, wherein a change in the amplitude of the output of said circuit means indicates a change in the level of the stored medium.

8. A level sensing system for determining the level of a stored medium indicative of the quantity thereof in a container made from non-conductive material, comprising
- a single stick-on metallic strip detachably applied to the exterior surface of the container and having a length approximately equal to the range of levels to be sensed,
- a circuit means having a source of electrical energy connected to said strip and arranged to induce an electrical characteristic therein in response to the range of levels to be determined, and for producing an output which fluctuates in direct proportion with the level of stored medium in the container, and
- indicating means connected to said circuit means and being sensitive to variations of said circuit means output for indicating the level of the stored medium in accordance with said variations,
- wherein said metallic strip is encapsulated with non-conductive material.

9. A sensing system for determining the position of the level of a stored medium as indicative of the quantity thereof in a container made from non-conductive material, comprising:
- a sensing circuit having an oscillator detector circuit and a source of electrical energy for energizing the same, said oscillator detector circuit including a variable amplitude output which amplitude changes according to changes in the level of the stored medium and a capacitor component thereof comprising a single unitary electrode arranged for varying the amplitude of said oscillator detector circuit output proportionately in accordance with variations in the electrostatic field emanating therefrom, said electrode being detachably applied to the exterior surface of the container along a line generally parallel to the direction of movement of the level of the medium through its range of movement; and
- an indicator device responsive to changes in said oscillator circuit output; wherein
- the electrostatic field emanating from said electrode varies in accordance with the level of the medium throughout its range of movement, and said indicator device correspondingly indicates such stored medium level; and
- said metallic strip is arranged as a capacitor component relative said oscillator circuit, and wherein an electrostatic field generated from such capacitor component is varied by the level of the stored medium resulting in operation of said indicating means.

* * * * *

UNITED STATES PATENT AND TRADEMARK OFFICE
CERTIFICATE OF CORRECTION

PATENT NO. : 5,005,407
DATED       : April 9, 1991
INVENTOR(S) : Terry D. Koon

It is certified that error appears in the above-identified patent and that said Letters Patent is hereby corrected as shown below:

Column 8, lines 46-47, change "indicating means" to --indicator device--.

Signed and Sealed this

Twenty-eighth Day of December, 1993

Attest:

BRUCE LEHMAN

Attesting Officer          Commissioner of Patents and Trademarks